United States Patent
Yeon

(10) Patent No.: US 11,121,771 B2
(45) Date of Patent: Sep. 14, 2021

(54) SYSTEM AND METHOD FOR PROVIDING INTEGRATED PROJECTION SERVICE OF PLURALITY OF SMART DEVICES IN VEHICLE

(71) Applicants: Hyundai Motor Company, Seoul (KR); Kia Motors Corporation, Seoul (KR)

(72) Inventor: Kyu Hyeok Yeon, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 248 days.

(21) Appl. No.: 16/444,257

(22) Filed: Jun. 18, 2019

(65) Prior Publication Data
US 2020/0195347 A1    Jun. 18, 2020

(30) Foreign Application Priority Data
Dec. 13, 2018   (KR) .................. 10-2018-0160943

(51) Int. Cl.
*H04B 10/00*    (2013.01)
*H04B 10/114*   (2013.01)
*H04J 14/00*    (2006.01)

(52) U.S. Cl.
CPC ................ *H04B 10/1149* (2013.01)

(58) Field of Classification Search
CPC .............. H04B 10/114; H04B 10/1141; H04B 10/1143; H04B 10/1149; H04W 8/00; H04W 4/48

See application file for complete search history.

(56) References Cited

U.S. PATENT DOCUMENTS

| 10,349,457 B1 * | 7/2019 | Oh ......................... H04W 4/48 |
| 2017/0195325 A1 * | 7/2017 | Yamamoto .......... H04L 63/0876 |
| 2019/0104385 A1 * | 4/2019 | Bednar ................ H04W 4/027 |

* cited by examiner

*Primary Examiner* — Daniel G Dobson
(74) *Attorney, Agent, or Firm* — Morgan, Lewis & Bockius LLP

(57) ABSTRACT

A system and method for providing an integrated projection service of a plurality of smart devices, for controlling services for the respective smart devices in the vehicle based on preset priorities of the services when a plurality of smart devices is connected to one vehicle using Wi-Fi, may include providing an integrated projection service of a plurality of smart devices in a vehicle may include making a request to a head unit of the vehicle for connection to enable wired or wireless data communication using Wi-Fi wireless communication technology provided in the vehicle, by at least one smart device positioned in the vehicle, and approving connection of a smart device, searching for service information to be provided by each smart device, and listing retrieved services to be integrated.

12 Claims, 4 Drawing Sheets

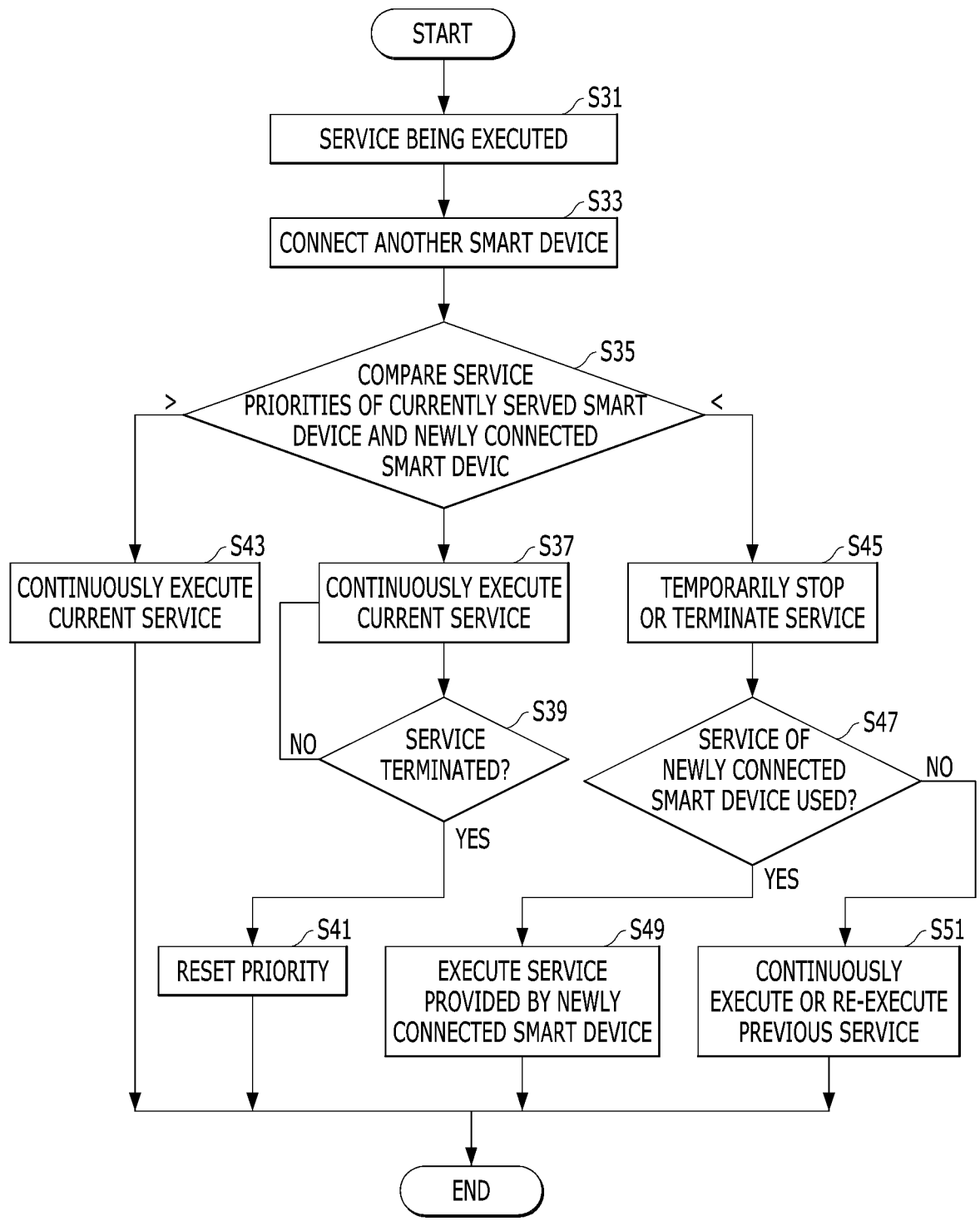

SYSTEM AND METHOD FOR PROVIDING INTEGRATED PROJECTION SERVICE OF PLURALITY OF SMART DEVICES IN VEHICLE

CROSS-REFERENCE TO RELATED APPLICATION

The present application claims priority to Korean Patent Application No. 10-2018-0160943, filed on Dec. 13, 2018, the entire contents of which is incorporated herein for all purposes by this reference.

BACKGROUND OF THE INVENTION

Field of the Invention

The present invention relates to a system and method for providing an integrated projection service of a plurality of smart devices, and more particularly, to a system and method for providing an integrated projection service of a plurality of smart devices in a vehicle, for integrating application information related to a plurality of smart devices positioned in the vehicle to provide a service.

Description of Related Art

In general, by the development of smart devices and wireless communication technologies, research has been actively conducted into technologies for expanding connectivity of a smart device owned by a driver riding inside a vehicle to an additional data service provided by the vehicle to provide a wider variety of additional services.

Currently, a smartphone projection function such as Android Auto or Apple CarPlay is supported only in a state in which a smart device and a vehicle are wirelessly connected to each other, and thus, it is possible to project a function of only one smartphone to a vehicle.

However, if a communication environment for facilitating Wi-Fi connection is provided in an internal compartment of a vehicle, it is possible to connect a plurality of smart devices positioned in the vehicle using a wireless method, and thus, there is a demand for technology for effectively projecting functions of a plurality of smartphones to a vehicle.

In such a situation, when a plurality of smart devices is connected via Wi-Fi in a vehicle, it is expected that which smart device provides an application service among the smart devices in a vehicle becomes an important issue.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method for providing an integrated projection service of a plurality of smart devices in a vehicle that substantially obviates one or more problems due to limitations and disadvantages of the related art.

Various aspects of the present invention are directed to providing a system and method for providing an integrated projection service of a plurality of smart devices, for controlling services for the respective smart devices in the vehicle based on preset priorities of the services when a plurality of smart devices are connected into one vehicle using Wi-Fi.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

To achieve these objects and other advantages and in accordance for an exemplary embodiment of the present invention, as embodied and broadly described herein, a system for providing an integrated projection service of a plurality of smart devices in a vehicle may include a head unit including a controller 20 configured to control approval when arbitrary smart devices 210 to 240 make a request for connection to enable wired or wireless data communication, to search for a service to be provided by a corresponding smart device, to integrate a plurality of service lists retrieved by each of the smart devices 210 to 240, and to list priorities for respective services to be provided in a vehicle, a transmission/reception unit 30 configured to receive a signal to request enabling wired or wireless data communication of the arbitrary smart devices 210 to 240, and a display unit 40 configured to display priorities for the respective listed services according to control of the controller 20.

In another aspect of the present invention, a method of providing an integrated projection service of a plurality of smart devices in a vehicle may include making a request to a head unit 100 of the vehicle for connection to enable wired or wireless data communication using Wi-Fi wireless communication technology provided in the vehicle, by at least one smart device 200 positioned in the vehicle, and approving connection of a smart device 210, searching for service information to be provided by each smart device 210, and listing retrieved services to be integrated, by the head unit 100.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a flowchart showing another example of an integrated projection procedure of a plurality of smart devices according to an exemplary embodiment of the present invention.

Figure 1:
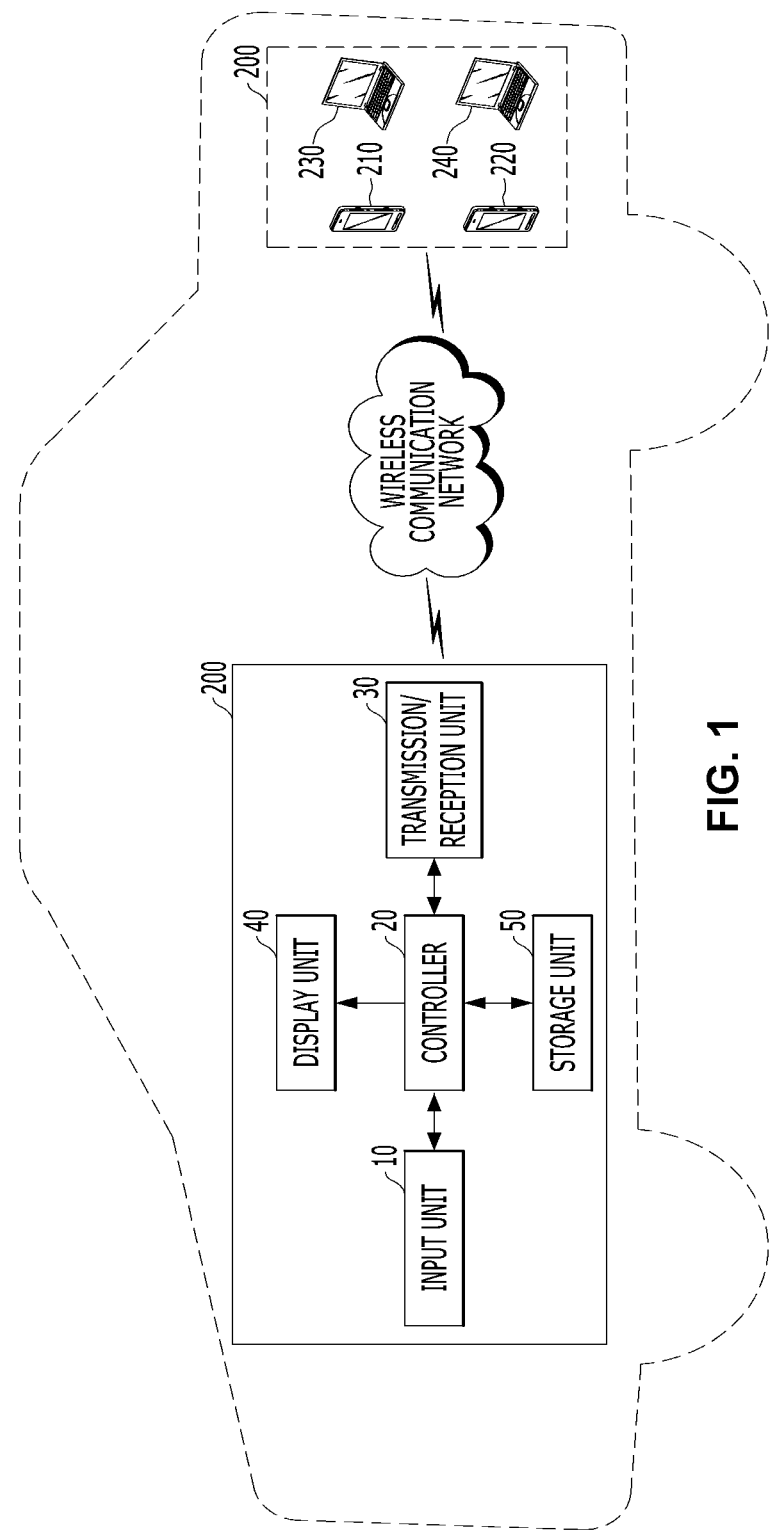
FIG. 1 is a block diagram of a system for providing an integrated projection service of a plurality of smart devices in a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention are described in detail for those of ordinary skill in the art to easily implement the present invention with reference to the accompanying drawings. However, the present invention may be implemented in various different forms and is not limited to these embodiments. To clearly describe the present invention, parts unrelated to the description are omitted in the drawings and like reference numerals in the specification denote like elements.

Throughout the specification, one of ordinary skill would understand terms "include", "comprise", and "have" to be interpreted by default as inclusive or open rather than exclusive or closed unless expressly defined to the contrary. Furthermore, terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings to refer to the same parts.

Hereinafter, the configuration and operation of a system for providing an integrated projection service of a plurality of smart devices in a vehicle, which is applicable to embodiments of the present invention, will be described in detail with reference to FIG. 1.

FIG. 1 is a block diagram of a system for providing an integrated projection service of a plurality of smart devices in a vehicle according to an exemplary embodiment of the present invention.

Referring to FIG. 1, the system for providing an integrated projection service of a plurality of smart devices in a vehicle according to an exemplary embodiment of the present invention may include a controller 20 that controls approval when arbitrary smart devices 210 to 240 make a request for connection for enabling wired or wireless data communication, searches for a service to be provided by a corresponding smart device, integrates a plurality of service lists retrieved by each of the smart devices 210 to 240, and lists priorities for respective services to be provided in a vehicle, a transmission/reception unit 30 for receiving a signal to request enabling wired or wireless data communication of the arbitrary smart devices 210 to 240, a display unit 40 for displaying priorities for the respective listed services according to control of the controller 20, and a storage unit 50 for storing or reading application information and an integrated service list of each of the smart devices 210 to 240 according to control of the controller 20.

Here, the system for providing an integrated projection service of a plurality of smart devices in a vehicle according to an exemplary embodiment of the present invention may further include an input unit 10 for inputting or selecting a specific command to manually determine the priorities for the respective listed services provided in the vehicle by a user of the vehicle, and when the user determines new priorities through the input unit 10, the controller 20 may configure a new integrated list and may control the display unit 40 to display the new integrated list.

Here, the smart device may be selected from communication devices that are configured for data-communicating by wire or wirelessly, such as a smartphone, a smart pad, a notebook computer, a tablet personal computer (PC), or a laptop computer.

Figure 2:
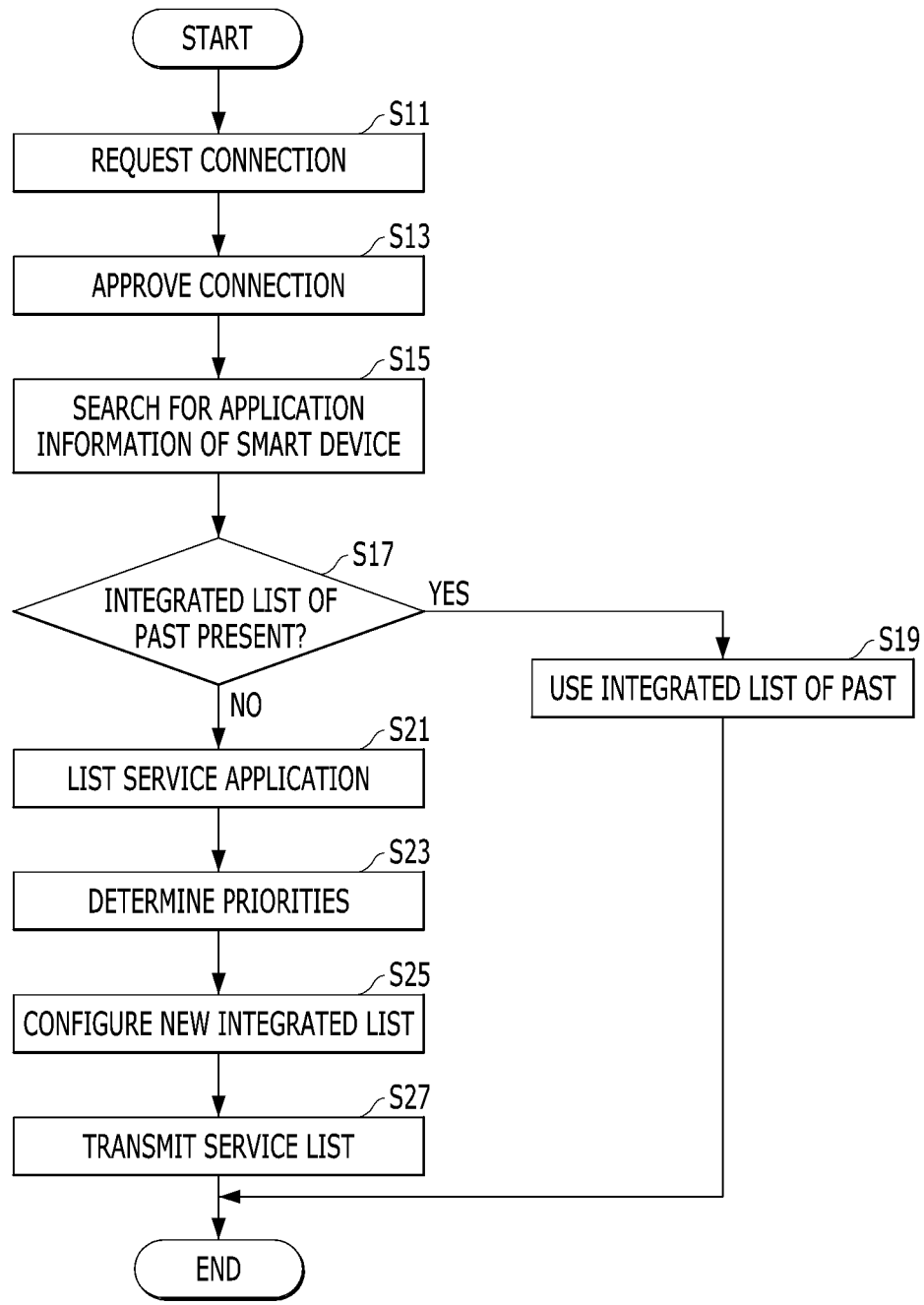
FIG. 2 is a flowchart of an integrated projection procedure of a plurality of smart devices according to an exemplary embodiment of the present invention.

FIG. 2 is a flowchart of an integrated projection procedure of a plurality of smart devices according to an exemplary embodiment of the present invention.

Referring to FIG. 2, one arbitrary smart device 210 of at least one smart device 200 positioned in a vehicle may make a request to a head unit 100 of the vehicle for connection to enable wired or wireless data communication using Wi-Fi wireless communication technology provided in the vehicle (S11).

In the instant case, the controller 20 of the head unit 100 may perform preset authentication on the corresponding smart device 210, and upon determining that this is a normal case, the controller 20 may approve connection with the corresponding smart device 210 (S13) and may search for application information related to the corresponding smart device 210 (S15).

As such, when there is a history in which the corresponding smart device 210 has been connected using the same Wi-Fi network, the controller 20 of the head unit 100 may determine whether an integrated list which is stored in the past is present (S17).

As the determination result of operation S17, upon determining that the integrated list which is stored in the past is present, the controller 20 of the head unit 100 may transmit the integrated service list, which is stored in the storage unit 50 in the past, to the display unit 40, and may display the integrated service list (S27).

On the other hand, upon determining that the integrated list which is stored in the past is not present, the controller 20 of the head unit 100 may additionally connect the other smart devices 220 to 240 into the vehicle, may list service applications provided by the other smart devices 220 to 240, and may display the service applications through the display unit 40, as shown in FIG. 2 (S21).

In the instant case, a user may manipulate the input unit 10 for each service application displayed through the display unit 40 of the head unit 100 and may manually determine priorities for respective service applications (S23).

Figure 3:
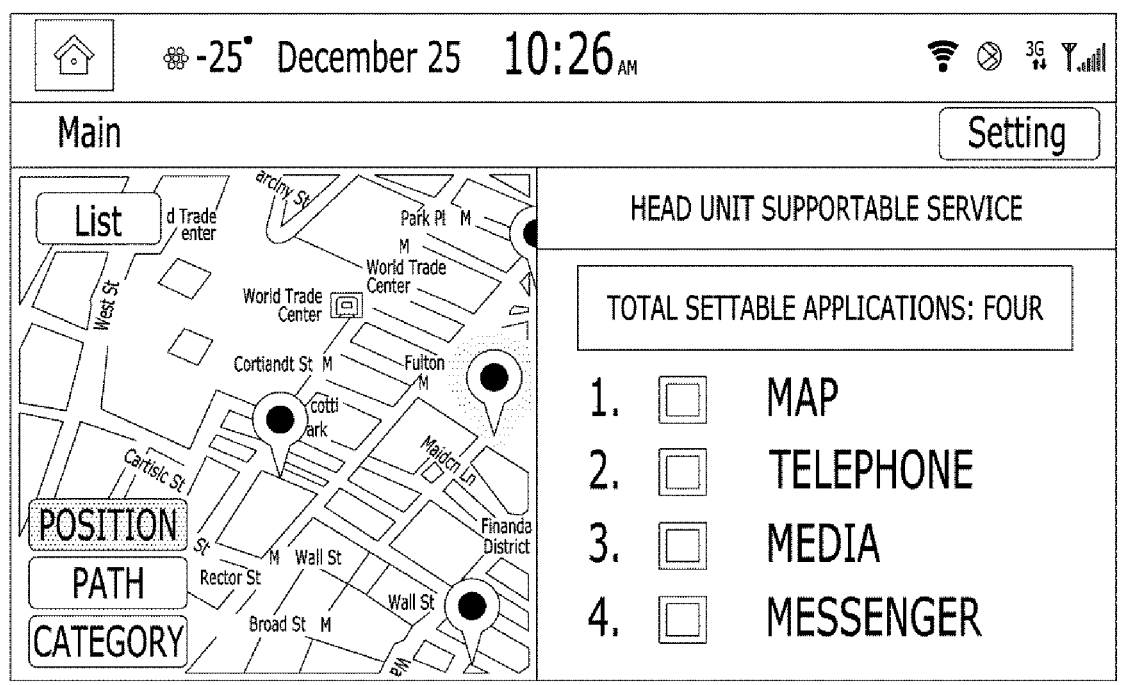
FIG. 3 is a diagram showing an example of an image displayed on a display of a vehicle when a plurality of smart devices are integrated in a vehicle according to an exemplary embodiment of the present invention.

For example, as shown in FIG. 3, the user may select a desired item among a map, a telephone, media, and a messenger application such as a Facebook or Telegram, and the total number of applications to be set may be changed depending on the number of applications installed in a smart device. Here, displayed items may be arranged according to priorities that are automatically determined based on a frequently used function for each smart device, and the priorities may be additionally changed via such a manual manipulation procedure.

In the instant case, the controller 20 of the head unit 100 may apply a relative first weight to a smart device of a driver using a telephone or a messenger service, and thus, when priorities are the same, the controller 20 may perform control to preferentially execute an additional service of the smart device of the driver.

The controller 20 of the head unit 100 may apply a second weight to an available service of the smart device 200 with a high frequency of connection and may perform control to secondly execute a corresponding additional service.

The priorities of the services in the integrated list may be manually adjusted, and when priorities are adjusted in each of the smart devices 210 to 240, if a priority of a specific smart device is behind priorities of other smart devices, the specific smart device may be disabled on the display unit 40.

The controller 20 of the head unit 100 may configure a new integrated service list according to priorities determined by the user (S25) and may display the newly configured integrated service list through the display unit 40, and the user may be provided with a desired additional service in the vehicle.

As shown in FIG. 4, in a state in which a specific service provided by a specific smart device is being executed (S31), when other smart devices are connected to the vehicle through a transmitter/receiver 3 of the head unit 100 (S33), the controller 20 of the head unit 100 may compare service priorities of a smart device that currently provides a specific service and a newly connected smart device (S35).

As the determination result of operation S35, upon determining that the priorities of the smart device that currently provides the specific service and the newly connected smart device are the same, the controller 20 may continuously execute the current service which is already connected and executed (S37).

The controller 20 may determine whether a specific service of a previously connected specific smart device is terminated (S39), and upon service termination, the controller 20 may display a preset pop-up window on the display unit 40 to allow a user to reset priorities (S41).

As the determination result of operation S35, upon determining that the service priority of the smart device configured for providing the current specific service is higher than the service priority of the newly connected smart device, the controller 20 may continuously execute the current service which is previously connected and executed (S43).

However, as the determination result of operation S35, upon determining that the service priority of the smart device configured for providing the current specific service is lower than the service priority of the newly connected smart device, the controller 20 may temporarily stop or terminate the currently executed service (S45) and may display a pop-up window on the display unit 40 to ask a user to use another service of the newly connected smart device (S47).

In the instant case, as the determination result of operation S47, when another service of the newly connected smart device is used, the controller 20 may completely terminate the previously executed and may execute another service provided by the newly connected smart device (S49).

However, as the determination result of operation S47, when another service of the newly connected smart device is not used, the controller 20 may continuously execute or re-execute a specific service which is temporarily stopped or is previously executed (S51).

In the aforementioned system and method for providing an integrated projection service of a plurality of smart devices according to an exemplary embodiment of the present invention, when a plurality of smart devices is connected to one vehicle using Wi-Fi, services for the respective smart devices may be advantageously controlled to be integrated into each other in the vehicle based on preset priorities of the services.

In the aforementioned system and method for providing an integrated projection service of a plurality of smart devices according to an exemplary embodiment of the present invention, when a plurality of smart devices is connected to one vehicle using Wi-Fi, services for the respective smart devices may be advantageously controlled to be integrated in the vehicle based on preset priorities of the services. Accordingly, the current limit of supporting only one smartphone like Android Auto or Apple CarPlay may be overcome, and various services provided to the respective smart devices may be configured to be integrated and various functions of smartphones may be used in a vehicle.

It will be appreciated by persons skilled in the art that the effects that could be achieved with the present invention are not limited to what has been particularly described hereinabove and other advantages of the present invention will be more clearly understood from the detailed description.

The aforementioned present invention can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for providing an integrated projection service of a plurality of smart devices in a vehicle and including a head unit, wherein the system comprises the head unit having:

a controller configured to control approval when smart devices make a request for connection to enable wired or wireless data communication, to search for a service to be provided by a corresponding smart device, to integrate a plurality of service lists retrieved by each of the smart devices, and to list priorities for respective services to be provided in the vehicle;

a transmission/reception unit connected to the controller and configured to receive a signal to request enabling wired or wireless data communication of the smart devices; and a display unit connected to the controller and configured to display priorities for the respective listed services according to control of the controller.

2. The system of claim 1, further including:

an input unit connected to the controller and configured to input or select a predetermined command to determine the priorities of the respective listed services manually provided by a user of the vehicle, wherein, in a response that the user determines new priorities through the input unit, the controller determines a new integrated list and displays the new integrated list through the display unit.

3. The system of claim 1, wherein, in a response that the priorities for the respective services are listed, the controller is configured to list the priorities of the respective services while applying weights depending on a frequency of usage of each of the smart devices or a service for each of the smart devices.

4. A method of providing an integrated projection service of a plurality of smart devices in a vehicle, the method including:

making a request to a head unit of the vehicle for connection to enable wired or wireless data communication using Wi-Fi wireless communication technology provided in the vehicle, by at least a smart device positioned in the vehicle; and approving, by the head unit, connection of a smart device, searching, by the head unit, for service information to be provided by each smart device, and listing, by the head unit, retrieved services to be integrated.

5. The method of claim 4, further including:

receiving, by the head unit, a user's manually adjusted priorities of lists for the respective services displayed on the head unit;

determining, by the head unit, a new integrated list according to the user's manually-adjusted priorities; and displaying, by the head unit, the determined new integrated service list.

6. The method of claim 4, further including:

displaying, by the head unit, a previously stored integrated service list on the head unit in searching for service information to be provided by each smart device, when there is a history in which a predetermined smart device has been connected using a same Wi-Fi network.

7. The method of claim 4, wherein, in a response that the priorities of the respective services are listed, the head unit is configured to list the priorities of the respective services while applying weights depending on a frequency of usage of at least one of each of the smart devices and a service for each of the smart devices.

8. The method of claim 4, wherein, in a response that another smart device is connected in a state in which a service of a predetermined smart device is being executed, the head unit is configured to compare service priorities of the predetermined smart device and a newly connected smart device, and provides a predetermined service according to one condition among a first condition in which the service priorities of the predetermined smart device and the newly connected smart device are a same, a second condition in which the service priorities of the predetermined smart device is higher than the service priorities of the newly connected smart device, and a third condition in which the service priorities of the predetermined smart device is lower than the service priorities of the newly connected smart device.

9. The method of claim 8, wherein in a response that the first condition is satisfied, the head unit is configured to maintain a current service thereof which is already connected and executed and, in a response that a service of the predetermined smart device is terminated, the head unit is configured to display a preset pop-up window on a display unit to allow a user to reset the priorities.

10. The method of claim 8, wherein in a response that the second condition is satisfied, the head unit is configured to maintain a current service thereof which is previously connected and executed.

11. The method of claim 8, wherein in a response that the third condition is satisfied, the head unit is configured to stop in a predetermined time period or terminate a current service thereof and to display a pop-up window on a display unit to ask a user to use another service of the newly connected smart device.

12. A non-transitory computer readable recording medium having recorded thereon a program for executing the method of claim 4.

* * * * *